United States Patent [19]

Herron

[11] Patent Number: 5,392,812

[45] Date of Patent: Feb. 28, 1995

[54] OFFSET HINGE FLAPPER VALVE

[75] Inventor: William L. Herron, West Chester, Ohio

[73] Assignee: General Electric Company, Cincinnati, Ohio

[21] Appl. No.: 985,718

[22] Filed: Dec. 4, 1992

[51] Int. Cl.⁶ ............................................. F16K 15/03
[52] U.S. Cl. .................................. 137/527.8; 251/287
[58] Field of Search ........................... 137/527, 527.8; 251/287

[56] References Cited

U.S. PATENT DOCUMENTS

| | | | |
|---|---|---|---|
| 386,461 | 7/1988 | Goll | 137/527 |
| 859,139 | 7/1907 | Spencer | 137/527.8 |
| 1,744,798 | 1/1930 | Price | 137/527 |
| 2,711,188 | 6/1955 | Nickerson | 137/527.8 |
| 2,781,054 | 2/1957 | Neumann | 137/527.8 |
| 2,859,772 | 11/1958 | Weiss | 137/527.8 |
| 2,934,084 | 4/1960 | Adams | 137/527.4 |
| 3,625,249 | 12/1971 | Karr | 137/527 |
| 3,941,151 | 3/1976 | Biddle | 137/527.8 X |
| 4,301,833 | 11/1981 | Donald | 137/527 |
| 4,908,028 | 3/1990 | Colon et al. | 137/527 |

FOREIGN PATENT DOCUMENTS 82874 6/1980 Japan ...................... 137/527.8

Primary Examiner—Robert G. Nilson
Attorney, Agent, or Firm—Jerome C. Squillaro; Bernard E. Shay

[57] ABSTRACT

An offset hinge flapper valve has a single valve plate rotatably mounted in the flow channel of a cast housing. The valve plate is freely rotatable about a pivot pin welded to the housing. The valve plate has first and second co-planar parts extending on respective sides of its axis of rotation, which is offset from the center axis of the flow channel. These co-planar parts have peripheral edges configured so that the valve plate has the same shape as the shape of the flow channel taken along an oblique section of the cast housing. A brace having an abutment surface is mounted on the valve plate. When the valve plate rotates to a predetermined inclined angle relative to the flow, the brace contacts the housing, thereby blocking further rotation and preventing flutter or instability of the valve plate in the open position. In the event of a loss of supply pressure, the backflow will exert an opposite moment on the valve plate, rotating it to an angular position whereat the valve plate closes off the flow channel.

4 Claims, 5 Drawing Sheets

OFFSET HINGE FLAPPER VALVE

FIELD OF THE INVENTION

This invention relates generally to piping for delivering air to a pressurized cavity. Specifically, the invention relates to an improved check valve which is applicable to all piping for delivering air to a pressurized cavity of a gas turbine engine.

BACKGROUND OF THE INVENTION

In conventional gas turbine aircraft engines, three primary designs for check valves are used in piping for delivering air to a pressurized cavity: the side hinge clam shell valve, the side hinge flapper valve and the center hinge flapper valve. The primary design criteria for any of these valves include the following: forward flow pressure drop, backflow leakage, cost, maintainability, reliability and weight.

When any one of the aforementioned conventional check valves is installed in piping, any steps or obstructions in the airflow path will contribute to pressure drops in the pipe flow and a less efficient system. Test data indicate that the side hinge flapper valve causes a significant reduction in the pipe flow, the side hinge clam shell valve causes very little drop in the pipe flow and the center hinge flapper valve causes a reduction in pipe flow which is only slightly greater than that caused by the side hinge clam shell valve.

With respect to backflow leakage, the center hinge flapper valve has been shown to be somewhat better than the side hinge clam shell valve. It is also significantly lower in cost than either the side hinge clam shell valve or the side hinge flapper valve. The center hinge flapper valve and the side hinge clam shell valve are similar in maintainability and reliability, whereas the side hinge flapper valve is less reliable in view of apparent field wear problems. The center hinge flapper valve is slightly lower in weight.

SUMMARY OF THE INVENTION

The present invention is an improvement over conventional check valves used in piping for delivering air to a pressurized cavity. The check valve of the invention is an offset hinge flapper valve having a single valve plate rotatably mounted in a cast housing. Casting of the housing reduces the amount of machining needed to make the check valve, thereby reducing the associated costs of manufacture.

The housing is cast such that the flow channel cross sections upstream and downstream of the valve plate merge gradually with the flow channel section in which the valve plate is mounted. The latter section comprises mutually opposing, parallel planar surfaces. This gradual transition minimizes the pressure losses associated with section changes, such as the steps in conventional check valve designs.

In accordance with the invention, the valve plate has first and second co-planar parts extending on respective sides of its axis of rotation. In the case where the flow channel is generally circular cylindrical, the axis of rotation is offset from the center axis. The first co-planar part of the valve plate has an area less than the area of the second co-planar part. These co-planar parts have peripheral edges configured so that the valve plate has the same shape as the shape of the flow channel taken along an oblique section of the cast housing. For example, in the case where the flow channel has a surface which is a portion of a circular cylindrical surface, the periphery of the valve plate includes a pair of peripheral edges shaped as elliptical arcs which contact the flow channel when the valve is closed. In the closed position, the valve plate seals the flow channel in the event of backflow from the pressurized cavity being supplied with air.

The valve plate is mounted in the housing using a pivot pin which is loosely fit in a transverse bore formed in the plate. At each end the pivot pin is welded in a respective bore formed in the cast housing. This arrangement allows the valve plate to swing freely about the pivot pin between a first angular position whereat the flow channel is open and a second angular position whereat the flow channel is closed. The pivot pin is located at the edge of the flat portions of the cast housing.

A brace having an abutment surface is mounted on the valve plate. During normal operation, the moment on the plate caused by the pressure of supplied air forces the valve plate to rotate to the first angular position whereat the abutment surface of the brace contacts the housing. This abutment blocks further rotation of the valve plate beyond the first angular position. The brace is configured such that the plate is maintained in the first angular position at a predetermined inclined angle relative to the direction of airflow through the flow channel. Maintaining the valve plate at this angle serves two functions: (1) the air maintains a moment on the valve plate, preventing flutter or instability of the valve plate; and (2) in the event of a loss of supply pressure, the backflow will exert an opposite moment on the valve plate, forcing it closed.

Because the valve in accordance with the invention requires that only a single plate be placed in the path of the airflow, the amount of obstruction to forward airflow is minimized. Since no seats are required for the valve plate mounting, no pressure loss due to such seats is incurred. Because the pivot pin is totally encased in the valve plate, there is no leakage around the pin in the event of backflow, and since the valve is sized to fit snugly in the housing, there is very little leakage around the valve plate. Thus, the amount of backflow will be reduced relative to the backflow attending conventional designs.

Also, the single-plate design of the invention has fewer components than any conventional check valve used in gas turbine engines. The reduced number of components coupled with the minimal machining required lowers the cost of manufacture of check valves according to the invention relative to the cost of manufacturing a check valve of conventional design. The weight of a check valve in accordance with the invention should be less than that of conventional designs. Because of its simplicity, the valve of the invention is expected to be at least as reliable and maintainable as any conventional designs, and will also be less costly to repair.

BRIEF DESCRIPTION OF THE DRAWINGS

These and other advantages of the invention will be better understood when the detailed description of the preferred embodiments of the invention is read in conjunction with the drawings, wherein.

DETAILED DESCRIPTION OF THE PREFERRED EMBODIMENTS

Figure 1:
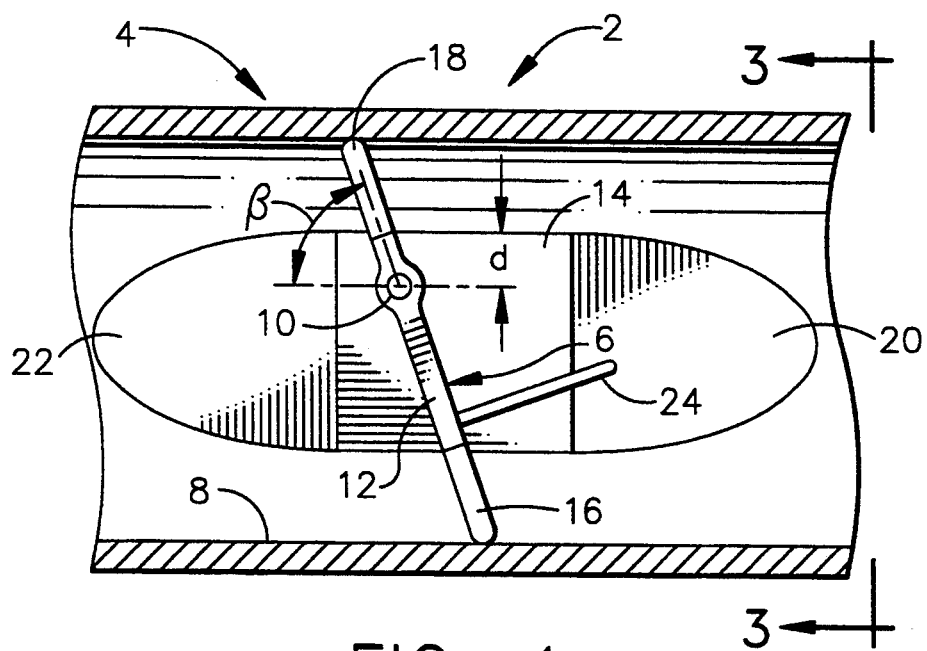
FIGS. 1 and 2 are partly sectioned side views of a check valve in accordance with a preferred embodiment of the invention, with the valve depicted in the closed and open states respectively.
Figure 2:
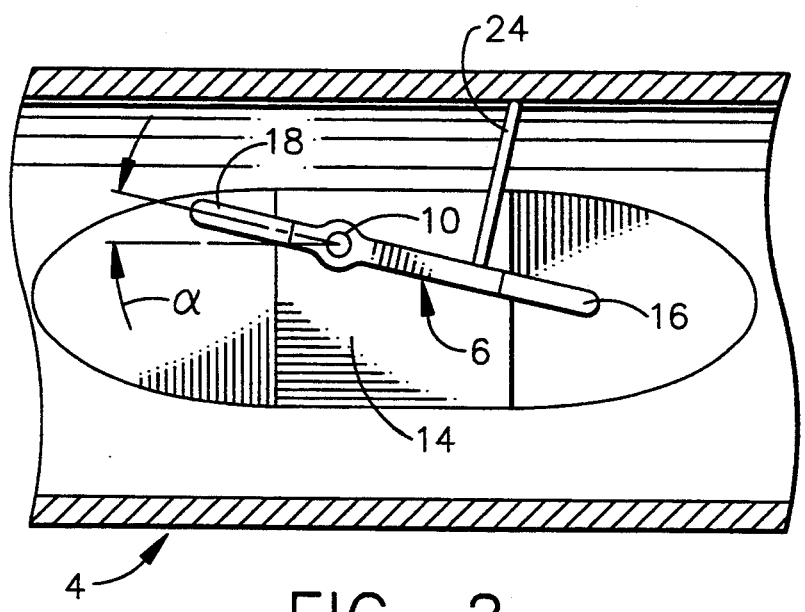
Figure 3:
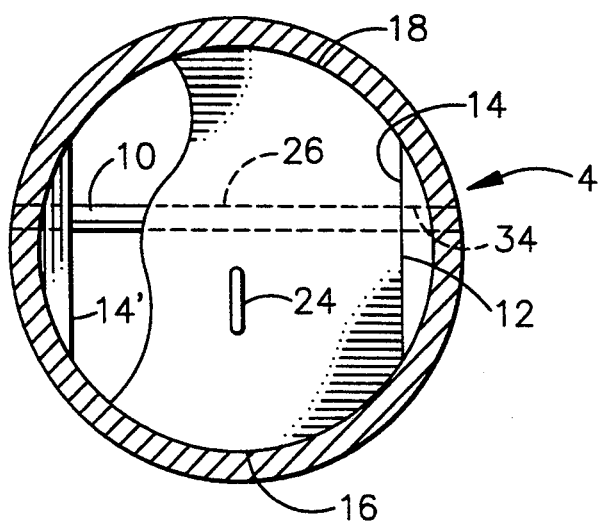
FIG. 3 is a sectional view taken along section 3—3 shown in FIG. 1.

A preferred embodiment of the invention is shown in FIGS. 1 through 3. This check valve, generally designated by numeral 2, is intended to be coupled between a source (not shown) of air and a pressurized cavity (not shown) to which air is being supplied (the supplied air flowing from left to right in FIG. 1). Check valve 2 has a first state for allowing air to flow therethrough under air delivery conditions and a second state for blocking backflow of air when the air delivery conditions are removed.

Check valve 2 has a cast housing 4 with a valve plate 6 rotatably mounted therein by way of a pivot pin 10. Cast housing 4 has a flow channel formed in part by a portion 8 of a substantially circular cylindrical surface and in part by a pair of mutually opposing and parallel planar surfaces 14, 14' separated by a predetermined distance. Planar surfaces 14, 14' are substantially parallel to the center axis of circular cylindrical portion 8.

In practice, it is preferred that the width of planar surfaces 14, 14' be as small as possible to minimize the flow disruption caused by the planar surfaces. To accomplish this, the width of planar surfaces 14, 14' should be reduced so that the top edge lies only slightly above the elevation of pin 10, that is, the distance d (see FIG. 1) between the top edge of the planar surfaces and pin 10 should be minimized. This will also minimize the required length of the check valve assembly.

The flow channel further comprises gradual transition surfaces 20 and 22 having a periphery defined by a respective juncture with the circular cylindrical portion 8 of the flow channel and a respective juncture with planar surface 14. A similar pair of gradual transition surfaces (not shown) are formed on the other side of the flow channel for facilitating the smooth flow of air from the circular cylindrical portion 8 to the opposing planar surface 14' (see FIG. 3). These gradual transition surfaces minimize the pressure losses associated with the change in cross section of the flow channel from the circular section of cylindrical portion 8 to the truncated circular section formed in part by parallel planar surfaces 14, 14'.

Valve plate 6 has a periphery which conforms to the shape of the flow channel along an oblique section of the housing taken at an angle $\beta$ (see FIG. 1). In particular, the plate periphery is formed in part by a pair of parallel straight edges 12 separated by a width slightly less than the predetermined distance separating planar surfaces 14, 14'. This play allows for any differential thermal growth between the valve plate and the cast housing. As best seen in FIG. 3, the periphery of valve plate 6 further comprises a first elliptical arc 16 connecting first ends of the parallel straight edges 12 and a second elliptical arc 18 connecting second ends of straight edges 12.

In accordance with the invention, the pivot pin 10 is a circular cylinder. The body of pivot pin 10 is loosely fit into a bore 26 cast in valve plate 6. (An alternative form of the valve plate would be a slightly thicker, but constant thickness, plate that could be machined from sheet stock.) Then the ends of pivot pin 10 are welded in respective bores 34 formed in the cast housing. Each bore 34 is substantially perpendicular to and intersects a corresponding planar surface 14, 14'. As a result, valve plate 6 is freely rotatable about an axis of rotation substantially perpendicular to planar surfaces 14, 14' of cast housing 4. The axis of rotation is offset from the center axis of the circular cylindrical portion 8 of the flow channel.

Valve plate 6 has two co-planar parts on opposing sides of its axis of rotation, one part having an area less than the area of the other part. As a result, the flow of air through the flow channel from the air supply to the pressurized cavity will produce a moment on the valve plate, causing it to rotate in a counter-clockwise direction from the closed angular position shown in FIG. 1 to the open angular position shown in FIG. 2. As used herein, the terms "clockwise" and "counter-clockwise" are not meant in any limiting sense, but rather are merely used to convey that the valve plate rotates in opposite directions about its axis. For example, when viewed from the other side, the valve plate would appear to rotate clockwise from the closed position of FIG. 1 to the open position of FIG. 2.

The check valve in accordance with the first preferred embodiment of the invention has a brace 24 rigidly connected to valve plate 6. In the closed angular position shown in FIG. 1, valve plate 6 is disposed at an angle $\beta$ relative to the center axis of the circular cylindrical portion 8 of the flow channel. In response to the flow of air being delivered from an air supply to the pressurized cavity, the valve plate rotates counter-clockwise until the tip of brace 24 abuts the housing wall as shown in FIG. 2. The brace 24 is configured so that rotation is halted when valve plate 6 is disposed at an angle $\alpha$ (see FIG. 2) relative to the center axis of the circular cylindrical portion 8 of the flow channel. Thus, the valve plate is freely rotatable through an angle which is less than 90 degrees, the angle $\beta$ being closer to a right angle than is the angle $\alpha$.

During normal operation, the moment on the plate caused by the pressure of the air being delivered to the pressurized cavity maintains the valve plate at the angle $\alpha$. Because the valve plate is maintained at an inclined angle $\alpha$ during the flow of supplied air, the supplied air maintains a moment on the valve plate which prevents flutter or instability of the valve plate. Also, in the event of a loss of supply pressure, the backflow will exert an opposite moment on the valve plate when disposed at the inclined angle $\alpha$, thus forcing it closed.

If there is a loss of supply pressure, the air in the pressurized cavity being fed by the pipe will try to flow back through the valve 2. This will exert a clockwise moment on the valve plate 6, rotating it to the closed angular position shown in FIG. 1. Since the plate conforms to the oblique section of the flow channel at that angle, the elliptical edges 16 and 18 will abut the circular cylindrical portion of the flow channel along respective elliptical arcs. Likewise the parallel straight edges 12 of the valve plate lie close to parallel planar surfaces 14, 14' at that angle. As a result, the valve plate fits snugly in the cast housing as shown in FIG. 1, effectively sealing off the flow of air through the flow channel.

Because the shape of the valve plate conforms to the shape of the flow channel along a section taken at the angle $\beta$, a good seal is achieved between the plate and the housing. However, it is conceivable that when the aircraft engine is not being operated, the valve plate could swing to the closed position and be wedged in place. This would cut off the flow of air from the cavity to be pressurized. To prevent this, it would be possible to cast another "stop" in the housing, thereby preventing full closure of the plate. This has the advantage of preventing accidental locking of the valve in a closed position, but would increase the leakage from a properly closed valve.

One solution to this problem is to cast valve seating in the housing to maintain the plate at the angle $\beta$ and trim the elliptical edges of the valve plate to be slightly undersized relative to the housing. This will maintain a very low backflow, but will slightly increase both the pressure drop across the open valve, by introducing a small step in the flow path, and the cost of the housing casting.

Figure 4:
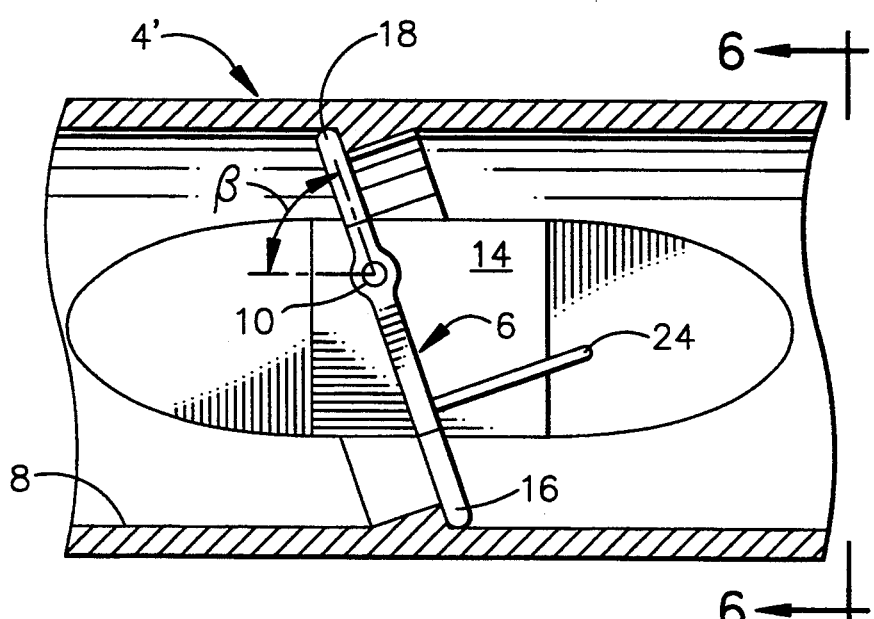
FIGS. 4 and 5 are partly sectioned side views of a check valve in accordance with a second preferred embodiment of the invention, with the valve depicted in the closed and open states respectively.
Figure 5:
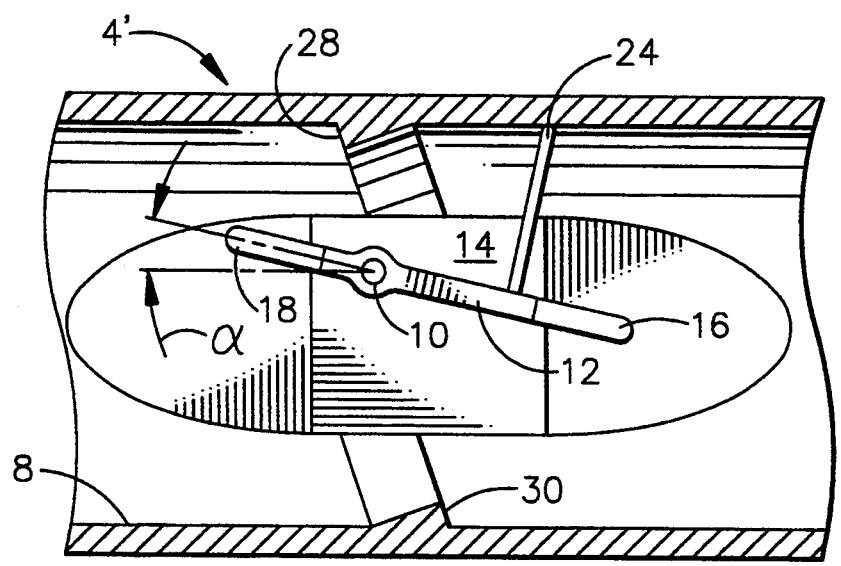
Figure 6:
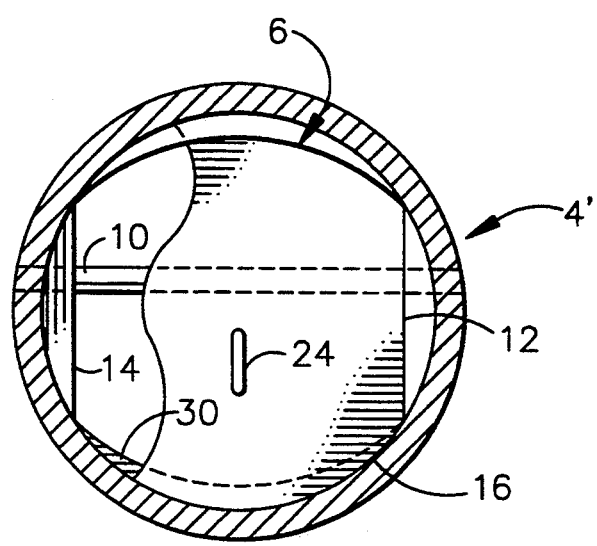
FIG. 6 is a sectional view taken along section 6—6 shown in FIG. 4.

A check valve provided with valve seating is depicted in FIGS. 4 through 6. This structure differs from the structure shown in FIGS. 1 through 3 only in that the housing 4' has been cast with two valve seats 28 and 30. Each valve seat is generally crescent-shaped with the height (measured in the radial direction) of the valve seats tapering off in the circumferential directions as they approach planar surfaces 14, 14', to minimize forward flow disruption. Alternatively, the seats could be constant in height and extend circumferentially to the planar surfaces, to minimize the potential backflow leakage. Which alternative is adopted will depend on the specific application of the valve.

In response to backflow, elliptical seats 28 and 30 will respectively abut the valve plate on opposite sides thereof, thereby blocking further rotation beyond the angular position shown in FIG. 4. Each seat is disposed at angle $\beta$ relative to the center axis of the flow channel.

Components of this second preferred embodiment which are substantially the same as corresponding components depicted in the first preferred embodiment are designated in FIGS. 4–6 by the same reference numerals used in FIGS. 1-3. The structure and operation of such components have already been described hereinabove and such description will not be repeated for the sake of brevity.

Figure 7:
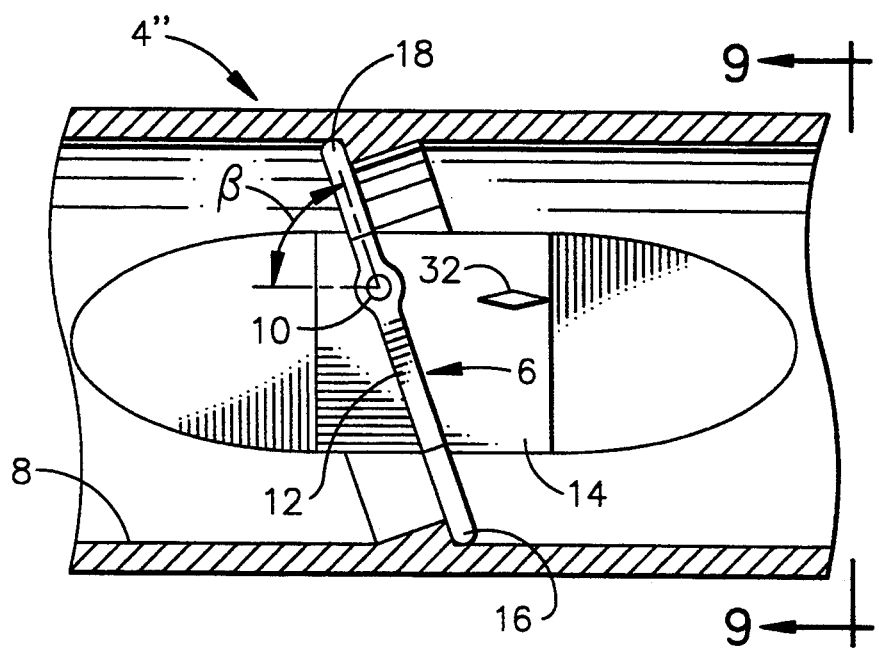
FIGS. 7 and 8 are partly sectioned side views of a check valve in accordance with a third preferred embodiment of the invention, with the valve depicted in the closed and open states respectively.
Figure 8:
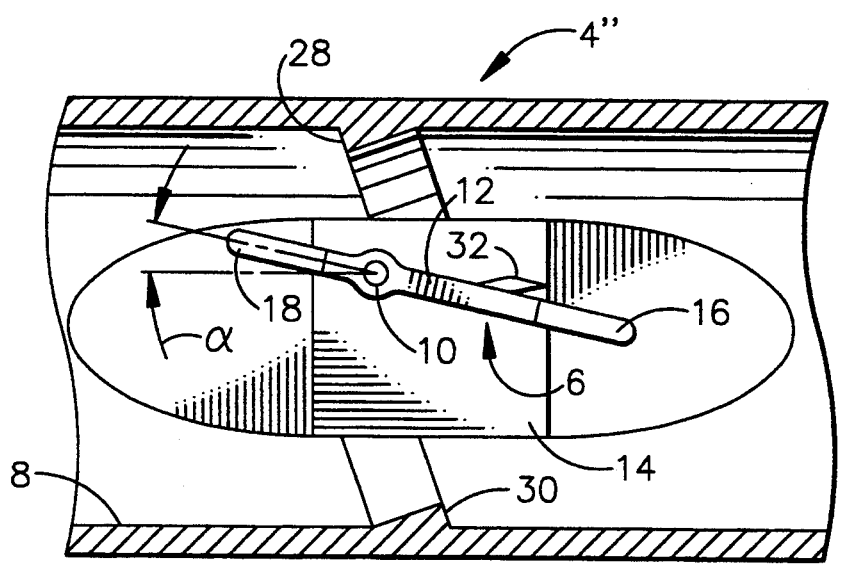
Figure 9:
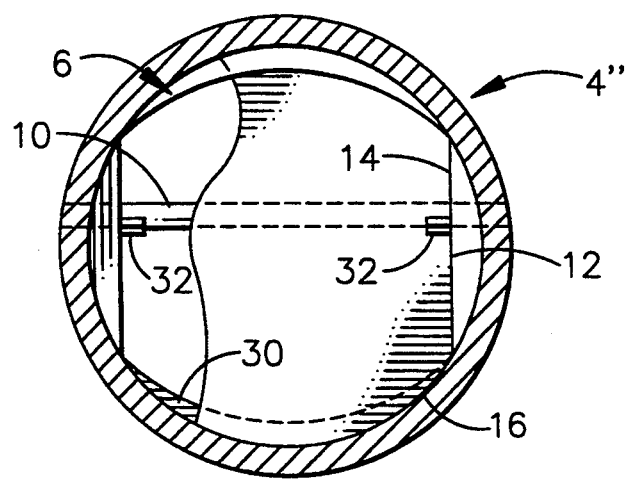
FIG. 9 is a sectional view taken along section 9—9 shown in FIG. 7.

A further simplification of the check valve of the invention would be to replace the brace 24 (see FIG. 1) with a "stop" cast into the housing. Since the sole purpose of the brace is to maintain the valve in the open position at the angle $\alpha$, a pair of small bumps cast in the housing on opposing sides of the valve plate can accomplish the same task. Eliminating the brace 24 would reduce the number of components, thereby lowering the cost of manufacture and the weight of the check valve, while enhancing the valve reliability. For these reasons, a housing 4" with a pair of stops 32 cast therein, as depicted in FIGS. 7 through 9, would be a preferred design for implementation. The stops 32 have a diamond-shaped cross section and are disposed so that the long axis of the diamond is substantially parallel to the center axis of the flow channel, as a result of which the cast stops present a minimal obstruction to the flow of air into the pressurized cavity.

The preferred embodiments have been described in detail hereinabove for the purpose of illustration only. It will be apparent to a practitioner of ordinary skill in the art of valves that various modifications could be made to the above-described structure without departing from the spirit and scope of the invention as defined in the claims set forth hereinafter. For example, the portion of the flow channel which is circular cylindrical could instead by conical or cylindrical with a cross section other than a circle. The configuration of the valve plate would then conform to the particular shape of an oblique section of the alternative flow channel. Also the single pivot pin could be replaced by tandem pivot pins welded in respective bores formed in the cast housing.

I claim:

1. A check valve having a first state for allowing air to flow therethrough generally in a predetermined direction under air delivery conditions and a second state for blocking airflow in a direction opposite to said predetermined direction under backflow conditions, comprising:

a cast housing having a flow channel formed in part by first and second mutually opposing, parallel planar surfaces separated by a predetermined distance, said first and second planar surfaces being substantially parallel to said predetermined direction;

a valve plate having a periphery formed in part by first and second parallel straight edges separated by a width slightly less than said predetermined distance; and pivot means for rotatably mounting said valve inside said cast housing such that said valve plate has an axis of rotation substantially perpendicular to and intersecting said first and second planar surfaces of said cast housing, wherein said valve plate has a first part on one side of said axis of rotation and a second part on the other side of said axis of rotation, said first and second parts of said valve plate being substantially co-planar and said first part of said valve plate having an area less than an area of said second part of said valve plate; and said valve plate is freely rotatable about said axis of rotation between a first angular position at which said flow channel is not closed in said first state and a second angular position at which said flow channel is not closed in said second state, said valve plate being disposed at first and second angles relative to said predetermined direction when said valve plate is in said first and second angular positions respectively, said second angle being closer to a right angle than is said first angle;

wherein the angle of rotation of said valve plate from said first angular position to said second angular position is less than a right angle;

wherein said cast housing further comprises first and second seats which respectively abut said valve plate on opposite sides thereof when said valve plate arrives at said second angular position, thereby blocking further rotation of valve paste beyond said second angular position, each of said first and second seats comprising a curved seating surface disposed at said second angle relative to said predetermined direction.

2. A check valve having a first state for allowing air to flow therethrough generally in a predetermined direction under air delivery conditions and a second state for blocking airflow in a direction opposite to said predetermined direction under blackflow conditions, comprising;

a cast housing having a flow channel formed in part by first and second mutually opposing and parallel planar surfaces separated by a predetermined distance, said first and second planar surfaces being substantially parallel to said predetermined direction, and in part by a portion of a circular cylindrical surface having a center axis;

a valve plate having a periphery formed by first and second parallel straight edges separated by a width slightly less than said predetermined distance, a first arc connecting first ends of said first and second parallel straight edges and a second arc connecting second ends of said first and second parallel straight edges; and pivot means for rotatably mounting said valve plate inside said cast housing such that said valve plate has an axis of rotation substantially perpendicular to and intersecting said first and second planar surfaces of said cast housing, said axis of rotation of said valve plate being offset from said center axis, wherein said valve plate is freely rotatable about said axis of rotation between first and second angular positions inclined at first and second angles respectively relative to said center axis, said second angle being closer to a right angle than is said first angle, said flow channel being not closed when said valve plate is in said first angular and said flow channel being closed when said valve plate is in said second angular position whereat said first and second arcs abut said cast housing, wherein said cast housing further comprises first and second seats which respectively abut said first and second arcs when said valve plate arrives at said second angular position, thereby blocking further rotation of valve plate beyond said second angular position, each of said first and second seats comprising a curved seating surface disposed at said second angle relative to said center axis.

3. A check valve having a first state for allowing air to flow therethrough generally in a predetermined direction under air delivery conditions and a second state for blocking airflow in a direction opposite to said predetermined direction under backflow conditions, comprising:

a cast housing having a flow channel for channeling flowing air in said predetermined direction, said flow channel being formed in part by first and second mutually opposing and parallel planar surfaces separated by a predetermined distance, said first and second planar surfaces being substantially parallel to said predetermined direction;

pivot means having a first end inserted in a bore formed in said first planar surface, a second end inserted in a bore formed in said second planar surface, and axial means supported by said first and second ends for defining an axis of rotation substantially perpendicular to and intersecting said first and second planar surfaces of said cast housing; and a valve plate having a periphery formed in part by first and second parallel straight edges separated by a width slightly less than said predetermined distance and a bore substantially perpendicular to said first and second parallel straight edges for receiving said axis means, said valve plate being freely rotatable about said axis of rotation between first and second angular positions, said valve plate being disposed at first and second angles relative to said predetermined direction when said valve plate is in said first and second angular positions respectively, said second angle being closer to a right angle than is said first angle, said valve plate having first and second co-planar parts extending on respective sides of said axis of rotation, said first co-planar part of said valve plate having an area less than an area of said second co-planar part of said valve plate, wherein said valve plate rotates to said first angular position in response to a moment exerted on said valve plate in a predetermined rotational direction by the air in said flow channel, whereby air flows through said flow channel in said predetermined direction, and said valve plate rotates to said second angular position in response to a moment exerted on said valve plate in a rotational direction opposite to said predetermined rotational direction by the air in said flow channel, whereby said flow channel is closed by said valve plate to prevent backflow of air in said direction opposite to said predetermined direction, wherein said flow channel further comprises a portion of a circular cylindrical surface having a center axis, said axis of rotation of said valve plate being offset from said center axis; said periphery of said valve plate further comprises a first arc connecting first ends of said parallel straight edges and a second arc connecting second ends of said parallel straight edges; and said cast housing further comprises first and second seats which respectively abut said valve plate on opposite sides thereof when said valve plate arrives at said second angular position, thereby blocking further rotation of valve plate beyond said second angular position, each of said first and second seats comprising a curved seating surface disposed at said second angle relative to said predetermined direction.

4. The check valve as defined in claim 3, further comprising flutter damping means for blocking rotation of said valve plate beyond said first angular position, said flutter damping means serving to damp flutter of said valve plate in said first angular position in response to variations in the pressure exerted by said air flowing in said predetermined direction through said open flow channel.

* * * * *